(12) United States Patent  
Stapleton

(10) Patent No.: US 12,231,584 B1  
(45) Date of Patent: Feb. 18, 2025

(54) RELYING PARTY OBJECT IDENTIFIERS SCHEMA (RPOIDS)

(71) Applicant: Wells Fargo Bank, N.A., San Francisco, CA (US)

(72) Inventor: Jeff J. Stapleton, Arlington, TX (US)

(73) Assignee: Wells Fargo Bank, N.A., San Francisco, CA (US)

( * ) Notice: Subject to any disclaimer, the term of this patent is extended or adjusted under 35 U.S.C. 154(b) by 266 days.

(21) Appl. No.: 17/993,051

(22) Filed: Nov. 23, 2022

(51) Int. Cl.  
*H04L 29/06* (2006.01)  
*H04L 9/08* (2006.01)  
*H04L 9/32* (2006.01)

(52) U.S. Cl.  
CPC .......... *H04L 9/3263* (2013.01); *H04L 9/0825* (2013.01); *H04L 9/3247* (2013.01)

(58) Field of Classification Search  
CPC .... H04L 9/3263; H04L 9/0825; H04L 9/3247  
See application file for complete search history.

(56) References Cited

U.S. PATENT DOCUMENTS

| | | | | |
|---|---|---|---|---|
| 5,903,882 | A * | 5/1999 | Asay ...................... | G06Q 10/10 |
| | | | | 713/156 |
| 6,802,002 | B1 * | 10/2004 | Corella .................... | G06F 21/33 |
| | | | | 713/157 |
| 9,935,953 | B1 * | 4/2018 | Costigan ............. | H04L 63/0876 |
| 10,277,406 | B1 * | 4/2019 | Veladanda ............ | H04L 9/0825 |
| 2009/0210703 | A1 * | 8/2009 | Epstein .................. | H04L 9/006 |
| | | | | 713/157 |
| 2017/0085380 | A1 * | 3/2017 | Pandrangi ........... | H04L 61/4511 |
| 2021/0136073 | A1 * | 5/2021 | Wang .................... | H04L 9/3247 |

* cited by examiner

*Primary Examiner* — William A Corum, Jr.  
(74) *Attorney, Agent, or Firm* — Foley & Lardner LLP

(57) ABSTRACT

The present disclosure is directed to systems, methods, and non-transitory computer-readable media including sending, by a relying party computing system to a subscriber computing system, an Object Identifier (OID) of a relying party associated with the relying party computing system, receiving, by the relying party computing system from the subscriber computing system, a certificate of a subscriber associated with the subscriber computing system, the certificate includes a public key of the subscriber, determining, by the relying party computing system, whether the certificate includes the OID of the relying party, and in response to determining that the certificate includes the OID of the relying party, using by the relying party computing system the public key in the certificate of the subscriber.

15 Claims, 6 Drawing Sheets

RELYING PARTY OBJECT IDENTIFIERS SCHEMA (RPOIDS)

BACKGROUND

In a Public Key Infrastructure (PKI), a Certificate Authority (CA) can issue a digital certificate having a subject (e.g., a name of an individual, company, organization, device, or so on) associated with a subscriber. A relying party receives the certificate of the subscriber and obtains from the certificate the issuing entity (e.g., the CA) and the subject. The relying party can obtain a CA certificate to obtain a public key of the CA in order to verify the certificate of the subscriber, in certificate chain validation which allows the relying party to trust the certificate. Upon establish trust in the certificate, the subscriber and the relying party can exchange or communicate data, messages, encrypted digital signatures, and so on.

Conventionally, the relying party may not have prior knowledge of the subscriber, such that the trust relationship under PKI between relying party and the subscriber is based primarily on the CA adequately performing due diligence on the subscriber. As a result, in some circumstances, conventional digital certificates and PKI fail to properly enforce authentication and authorization.

SUMMARY

Arrangements of the present disclosure relate to sending, by a relying party computing system to a subscriber computing system, an Object Identifier (OID) of a relying party associated with the relying party computing system, receiving, by the relying party computing system from the subscriber computing system, a certificate of a subscriber associated with the subscriber computing system, the certificate including a public key of the subscriber, determining, by the relying party computing system, whether the certificate includes the OID of the relying party, and in response to determining that the certificate includes the OID of the relying party, using by the relying party computing system the public key in the certificate of the subscriber.

Some arrangements relate to receiving, by a subscriber computing system from a relying party computing system, an OID of a relying party associated with the relying party computing system, generating a public key of a subscriber associated with the subscriber computing system and a private key of the subscriber, the private key corresponding to the public key, sending, by the subscriber computing system to a Certificate Authority (CA) computing system, a request for a certificate, the request including the public key of the subscriber and the OID of the relying party, receiving, by the subscriber computing system from the CA computing system, the certificate of the subscriber in response to the request, wherein the certificate includes the public key of the subscriber and the OID of the relying party, and sending, by the subscriber computing system to the relying party computing system, the certificate of the subscriber, the relying party computing system use the public key in the certificate of the subscriber in response to the relying party computing system authenticating the OID of the relying party.

Some arrangements relate to receiving, by a Certificate Authority, a request for a digital certificate, the request including an OID of a relying party associated with a relying party computing system, generating, by the CA authority, a certificate comprising the OID of the relying party, and sending, by the CA authority, the certificate to a subscriber computing system, wherein the relying party computing system use the public key in the certificate in response to authenticating the OID of the relying party.

These and other features, together with the organization and manner of operation thereof, will become apparent from the following detailed description when taken in conjunction with the accompanying drawings.

DETAILED DESCRIPTION

Referring generally to the FIGS., apparatuses, systems, methods, and non-transitory computer-readable media described herein relate to a Relying Party Object Identifiers Schema (RPOIDS) by which a relying party can accept a subscriber certificate for use with an application. In some examples, the relying party coordinates the inclusion of a proprietary Object Identifier (OID) of the relying party with the subscriber. The coordination between the relying party and the subscriber is access control for deterring unauthorized issuance of the OID of the relying party. In some examples, the CA has no knowledge of the relying party. In some examples, the CA can verify the OID of the relying party with the relying party. If the subscriber sends the wrong certificate to an relying party, the receiver (the relying party) can rejects the certificates because the certificate of the subscriber does not include the OID of the receiver. Similarly, if the relying party receives a certificate with the wrong OID or missing OID, the relying party can reject the certificate. In some examples, the relying party can issue multiple OIDs to a subscriber in cooperation with the CA. The same certificate can include the multiple OIDs. In some examples, the subscriber can use a unique certificate per OID. The particular implementation may depend on the relying party operations and risk management.

Figure 1:
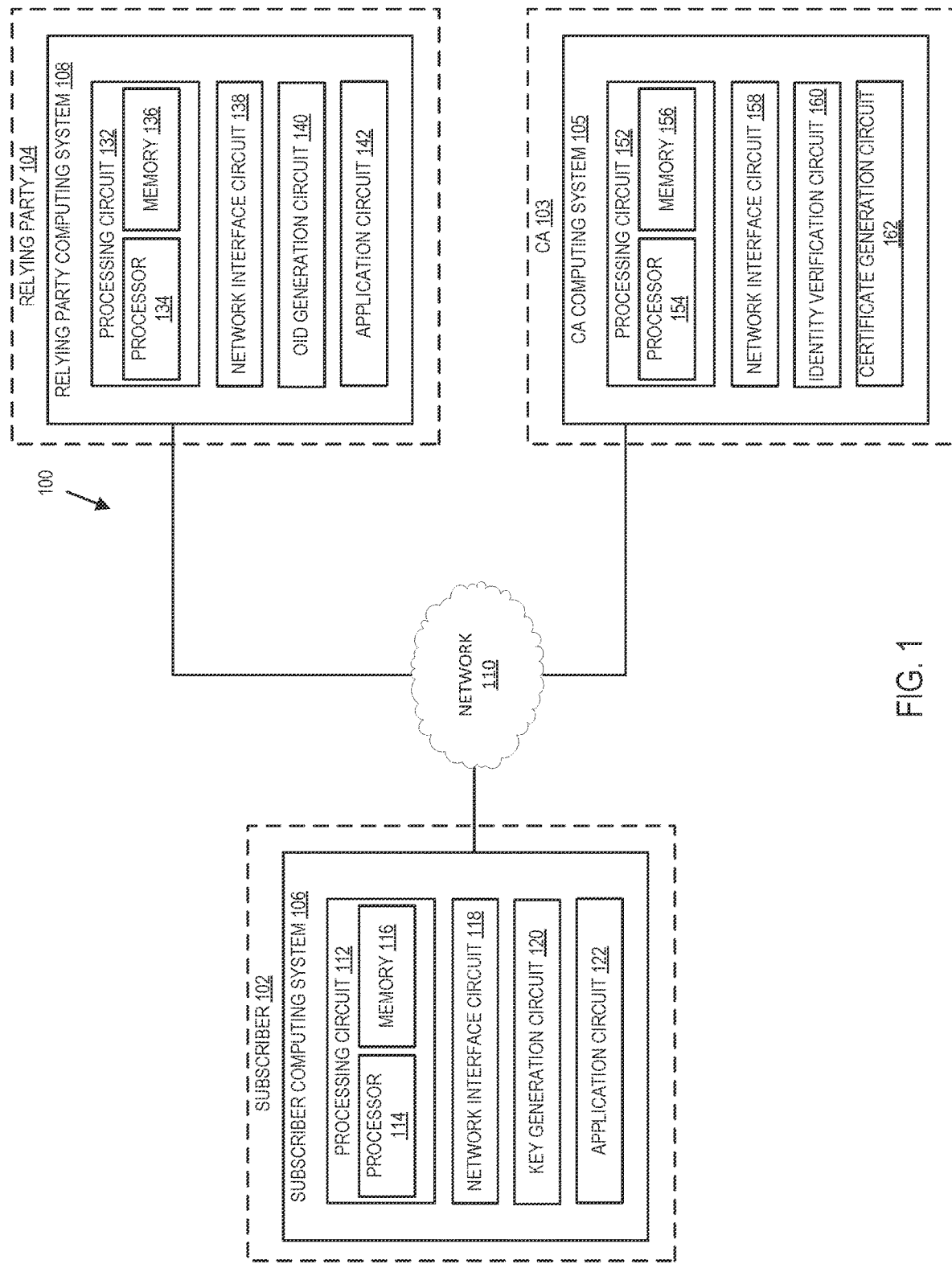
FIG. 1 is a block diagram of a system configured to implement Relying Party Object Identifiers Schema (RPOIDS), according to some arrangements.

FIG. 1 is a block diagram of a system 100 configured to implement Relying Party Object Identifiers Schema (RPOIDS), according to some arrangements. The system 100 includes at least a subscriber computing system 106, a relying party computing system 108, and a CA computing system 105. The system 100 facilitates digital certificate management between various parties, including a subscriber 102, a relying party 104, and a CA 103. The subscriber 102 and the relying party 104 are entities (e.g., individuals, companies, organizations, systems, servers, etc.) desiring to securely communicate with each other. For example, the relying party 104 can be a party requesting a digital certificate of the subscriber 102 to accomplish secure communication with the subscriber 102 using a public key of the subscriber 102 that is included in the certificate of the subscriber 102. The subscriber 102 is associated with, operates, or performs computing functions through the subscriber computing system 106. The relying party 104 is associated with, operates, or performs computing functions through the relying party computing system 108. The CA 103 is associated with, operates, or performs computing functions through the CA computing system 105.

The subscriber 102, via the subscriber computing system 106, can generate a public/private key pair and sends the public key with a digital certificate request to be validated by the CA 103 at the CA computing system 105. The relying party 104 relies on the CA 103 as a trusted third party and uses the CA public key to determine that the subscriber 102 has a verified identity by verifying a certificate of the subscriber 102 that is issued by the CA computing system 105. The CA 103 is a trusted third party of the relationship between the subscriber 102 and the relying party 104. The CA computing system 105 receives the digital certificate request from the subscriber computing system 106 along with the public key of the subscriber 102 and generates and signs the digital certificate with a CA private key. Furthermore, the CA 103 can have a certificate practice statement, policies, relying party agreements, and so on, that the subscriber 102 and relying party 104 agree to by accepting the digital certificate generated for the user 102.

Each of the subscriber computing system 106, the relying party computing system 108, and the CA computing system 105 is a computing system having processing, storage, and networking capabilities. In some arrangements, the subscriber computing system 106, the relying party computing system 108, and the CA computing system 105 can be Internet-connected or network-connected computing devices e.g., computers, servers, mobile devices, datacenters, smartphones, smart wearables, etc. The relying party computing system 108 can include any type of device or system configured to execute one or more software applications. In some arrangements, the relying party computing system 108 can include an operating system (e.g., Windows, Linux, MAC OS, etc.) on which the software applications can be executed.

The subscriber computing system 106, the relying party computing system 108, and the CA computing system 105 can transfer communications, data, information, messages, certificates, and so on, using the network 110. The network 110 is any suitable Local Area Network (LAN), Wide Area Network (WAN), or a combination thereof. For example, the network 110 can be supported by Frequency Division Multiple Access (FDMA), Time Division Multiple Access (TDMA), Code Division Multiple Access (CDMA) (particularly, Evolution-Data Optimized (EVDO)), Universal Mobile Telecommunications Systems (UMTS) (particularly, Time Division Synchronous CDMA (TD-SCDMA or TDS) Wideband Code Division Multiple Access (WCDMA), Long Term Evolution (LTE), evolved Multimedia Broadcast Multicast Services (eMBMS), High-Speed Downlink Packet Access (HSDPA), and the like), Universal Terrestrial Radio Access (UTRA), Global System for Mobile Communications (GSM), Code Division Multiple Access 1× Radio Transmission Technology (1×), General Packet Radio Service (GPRS), Personal Communications Service (PCS), 802.11X, ZigBee, Bluetooth, Wi-Fi, any suitable wired network, combination thereof, and/or the like. The network 110 is structured to permit the exchange of data, values, instructions, messages, and the like.

In some arrangements, the subscriber computing system 106 includes a processing circuit 112 having a processor 114 and a memory 116. The processor 114 is implemented as a general-purpose processor, an Application Specific Integrated Circuit (ASIC), one or more Field Programmable Gate Arrays (FPGAs), a Digital Signal Processor (DSP), a group of processing components, or other suitable electronic processing components. The memory 116 (e.g., Random Access Memory (RAM), Read-Only Memory (ROM), Non-Volatile RAM (NVRAM), Flash Memory, hard disk storage, etc.) stores data and/or computer code for facilitating the various processes described herein. Moreover, the memory 116 is or includes tangible, non-transient volatile memory or non-volatile memory. Accordingly, the memory 116 includes database components, object code components, script components, or any other type of information structure for supporting the various activities and information structures described herein. The processing circuit 112 can be used to implemented one or more of the circuits 118, 120, and 122.

The network interface circuit 118 is configured for and structured to establish a connection and communicate with the relying party computing system 108 and the CA computing system 105 via the network 110. The network interface circuit 118 is structured for sending and receiving data over a communication network (e.g., the network 110). Accordingly, the network interface circuit 118 includes any of a cellular transceiver (for cellular standards), wireless network transceiver (for 802.11X, ZigBee, Bluetooth, Wi-Fi, or the like), wired network interface, or a combination thereof. For example, the network interface circuit 118 may include wireless or wired network modems, ports, baseband processors, and associated software and firmware.

The key generation circuit 120 is structured to generate a public/private key pair associated with the subscriber 102 for encrypting and decrypting data, as described herein. The public/private key pair is associated with a digital certificate in a PKI, for example, the X.509 certificate, as described herein. The private/public key pair must be generated together as they are mathematically related. The key generation circuit 120 uses the private key to sign the public key, and sends the public key to the CA computing system 105 using the network interface circuit 118.

The application circuit 122 can be used to execute one or more applications or software on the subscriber computing system 106 for which communication with the relying party computing system 108 is needed. For example, the application circuit 122 can execute one or more applications that generate data, information, messages, and so on to be sent to the relying party computing system 108. Likewise the one or more applications executed on the application circuit 122 receive data, information, messages, and so on from the relying party computing system 108. In addition, the application circuit 122 includes suitable encrypt and decrypt functions as described herein to encrypt outbound data, information, messages, and so on to be sent to the relying party computing system 108 and decrypt inbound data, information, messages, and so on from the relying party computing system 108.

In some arrangements, the relying party computing system 108 includes a processing circuit 132 having a processor 134 and a memory 136. The processor 134 is implemented as a general-purpose processor, an ASIC, one or more FPGAs, a DSP, a group of processing components, or other suitable electronic processing components. The memory 136 (e.g., RAM, ROM, NVRAM, Flash Memory, hard disk storage, etc.) stores data and/or computer code for facilitating the various processes described herein. Moreover, the memory 136 is or includes tangible, non-transient volatile memory or non-volatile memory. Accordingly, the memory 136 includes database components, object code components, script components, or any other type of information structure for supporting the various activities and information structures described herein. The processing circuit 132 can be used to implemented one or more of the circuits 138, 140, and 142.

The network interface circuit 138 is configured for and structured to establish a connection and communicate with the subscriber computing system 106 and the CA computing system 105 via the network 110. The network interface circuit 138 is structured for sending and receiving data over a communication network (e.g., the network 110). Accordingly, the network interface circuit 138 includes any of a cellular transceiver (for cellular standards), wireless network transceiver (for 802.11X, ZigBee, Bluetooth, Wi-Fi, or the like), wired network interface, or a combination thereof. For example, the network interface circuit 138 may include wireless or wired network modems, ports, baseband processors, and associated software and firmware.

The OID generation circuit 140 is structured to generate one or more OIDs and send the one or more OIDs to the subscriber computing system 106 via the network interface circuit 138, as described herein. Each OID can identify the relying party 104, the relying party computing system 108, an application on the relying party computing system 108, a usage of the certificate, a development stage, a version of an application, or so on.

The application circuit 142 can be used to execute one or more applications or software on the relying party computing system 108 for which communication with the subscriber computing system 106 is needed. For example, the application circuit 142 can execute one or more applications that generate data, information, messages, and so on to be sent to the subscriber computing system 106. Likewise the one or more applications executed on the application circuit 142 receive data, information, messages, and so on from the subscriber computing system 106. In addition, the application circuit 142 includes suitable encrypt and decrypt functions as described herein to encrypt outbound data, information, messages, and so on to be sent to the subscriber computing system 106 and decrypt inbound data, information, messages, and so on from the subscriber computing system 106. For example, the application circuit 142 can encrypt message intended for the subscriber computing system 106 using a public key of the subscriber 102.

In some arrangements, the CA computing system 105 includes a processing circuit 152 having a processor 154 and a memory 156. The processor 154 is implemented as a general-purpose processor, an ASIC, one or more FPGAs, a DSP, a group of processing components, or other suitable electronic processing components. The memory 156 (e.g., RAM, ROM, NVRAM, Flash Memory, hard disk storage, etc.) stores data and/or computer code for facilitating the various processes described herein. Moreover, the memory 156 is or includes tangible, non-transient volatile memory or non-volatile memory. Accordingly, the memory 156 includes database components, object code components, script components, or any other type of information structure for supporting the various activities and information structures described herein. The processing circuit 152 can be used to implemented one or more of the circuits 158, 160, and 162.

The network interface circuit 158 is configured for and structured to establish a connection and communicate with the subscriber computing system 106 and the relying party computing system 108 via the network 110. The network interface circuit 158 is structured for sending and receiving data over a communication network (e.g., the network 110). Accordingly, the network interface circuit 158 includes any of a cellular transceiver (for cellular standards), wireless network transceiver (for 802.11X, ZigBee, Bluetooth, Wi-Fi, or the like), wired network interface, or a combination thereof. For example, the network interface circuit 158 may include wireless or wired network modems, ports, baseband processors, and associated software and firmware.

The identity verification circuit 160 is structured to verify the identity of the subscriber 102 requesting a digital certificate. To generate a digital certificate, the CA computing system 105 first verifies the identity of the subscriber 102 that is to be associated with the public key of the subscriber 102 on the digital certificate. To verify the identity of a subscriber 102, the identity verification circuit 160 receives information from the subscriber computing system 106 regarding the identity of the subscriber 102. The identity verification circuit 160 checks that the request for a digital certificate is in compliance with certificate practice statements and policies. Then, the identity verification circuit 160 authenticates the identity of the subscriber 102 in according with those statements and policies. In some arrangements, the identity verification is completed by a front end Registration Authority (RA). The RA checks that requests are valid and authenticates the identity of the subscriber 102 in accordance with requirements in the practice statements and policies. Once satisfied, the RA forwards the request to the CA computing system 105 to sign and issue a digital certificate to the intended subscriber 102.

The certificate generation circuit 162 is configured to issue digital certificates in the manner described herein. In some examples, a digital certificate may certify the ownership of a public key by the named subject of the certificate. In some implementations, the format of these certificates may be specified by the X.509 standard or another suitable standard. For example, the certificate generation circuit 162 can generate a certificate of the subscriber 102 and embed the OID of the relying party 104 in metadata or an extension of the certificate in the manner described herein.

While various circuits, interfaces, and logic with particular functionality are shown, it should be understood that each of the computing systems 102, 104, and 105 includes any number of circuits, interfaces, and logic for facilitating the operations described herein. For example, the activities of multiple circuits are combined as a single circuit and implemented on the same processing circuit (e.g., the processing circuit), as additional circuits with additional functionality are included.

Figure 2:
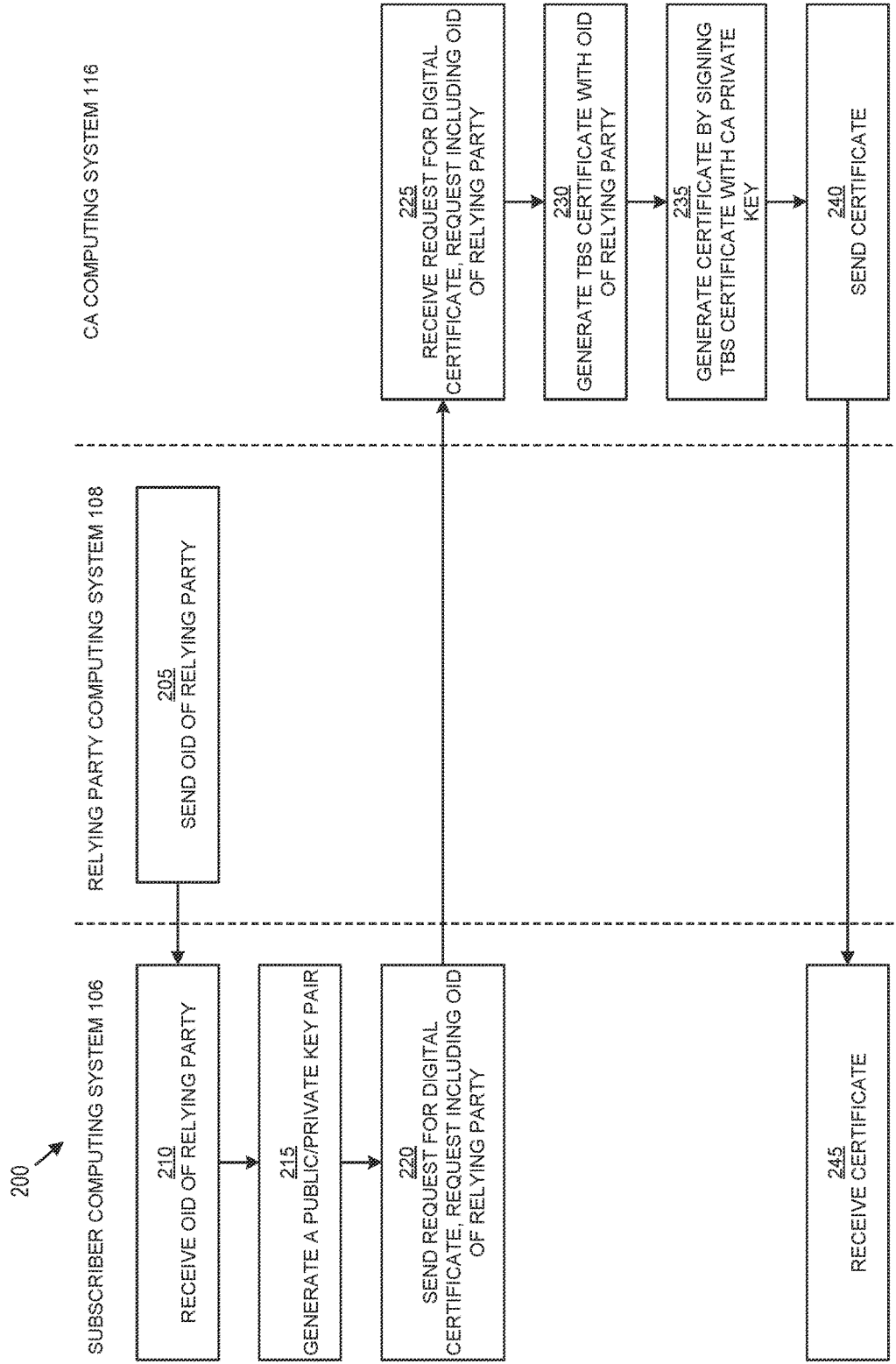
FIG. 2 is a method for generating a certificate with an OID of a relying party, according to various arrangements.

FIG. 2 is a method 200 for generating a certificate with an OID of the relying party 104, according to various arrangements. The method 200 can be performed by at least the subscriber computing system 106, the relying party computing system 108, and the CA computing system 105. For example, the subscriber computing system 106 can perform blocks 210, 215, 220, and 245. The relying party computing system 108 can perform block 205. The CA computing system 105 can perform the blocks 225, 230, 235, and 240. In the method 200, the subscriber computing system 106, the relying party computing system 108, and the CA computing system 105 can coordinate to issue a certificate (e.g., a digital certificate) with an OID of the relying party 104.

At 205, the relying party computing system 108 sends to the subscriber computing system 106 via the network 110, an OID of the relying party 104. In some examples, the relying party computing system 108 sends the OID of the relying party 104 to the subscriber computing system 106 in response to a request received from the subscriber computing system 106. In some examples, the subscriber computing system 106 can assign an OID of the replying party 104 for the relying party 104 (205 and 210 are omitted). In some examples, the subscriber computing system 106 can look up or search for an OID of the replying party 104, and send the OID of the relying party 104 to the relying party computing system 108 for verification (205 and 210 are omitted). At 210, the subscriber computing system 106 receives from the relying party computing system 108 via the network 110, the OID of the relying party 104. For example, the relying party 104 and the subscriber 102 may have some type of business relationship such that communications (e.g., exchange of data) between the relying party computing system 108 and the subscriber computing system 106 are needed and forthcoming. This allows the subscriber 102 to have the OID of the relying party 104 before the subscriber computing system 106 sends a certificate of the subscriber 102 to the relying party computing system 108. In some examples, the OID of the relying party 104 can include one or more identifiers for one or more of the relying party 104, the relying party computing system 108, an application on the relying party computing system 108, a usage of the certificate, a development stage, a version of an application, or so on. In some examples, the identifier of the relying party 104 may be the same as or different from the identifier of the relying party computing system 108.

In some examples, the relying party computing system 108 signs each of at least one OID of the relying party 104 with a private key of the relying party 104, and then the signed at least one OID of the relying party 104 is sent to the subscriber computing system 106 at 205. This improves security of the OID of the relying party 104 as it is being communicated between the subscriber computing system 106 and the relying party computing system 108.

In some examples, the OID of the relying party 104 includes a plurality of OIDs, each of the plurality of OIDs corresponds to or identifies one of multiple applications running on the relying party computing system 108. An application running on the relying party computing system 108 can be any type of software program executed by the processing circuit of the relying party computing system 108 that provides a specific function for the relying party 104. Examples of the application include, a web browser, an e-mail program, a Short Messaging Service (SMS), a word processor, a financial program, a Human Resources (HR) program, and so on.

At 215, the subscriber computing system 106 generates a public and private key pair. The public and private key pair includes a public key and a private key of the subscriber 102. Each of the public key and the private key of the subscriber 102 can include a string of data used for cryptographic functions including, but not limited to, authentication, authorization, and encryption.

The subscriber computing system 106 includes the OID of the relying party 104 in a certificate of the subscriber 102. For example, at 220, the subscriber computing system 106 sends, via the network 110, a request for a certificate (e.g., a digital certificate) to the CA computing system 105, where the request includes the OID of the relying party 104 received at 210. An example of the request for certificate can be a Certificate Signing Request (CSR) e.g., RFC 2986 PKCS #10 Certification Request Syntax Specification Version 1.7. At 225, the CA computing system 105 receives, via the network 110 from the subscriber computing system 106, the request for the certificate (e.g., a digital certificate), where the request includes the OID of the relying party 104. The OID of the relying party 104 can include one OID or a plurality of OIDs as described. The request further includes the subject name and the public key generated at 215. For example, the CSR includes a digital signature, and the subscriber computing system 106 basically signs the public key using the private key as proof that the subscriber 102 is the key owner At 230, the CA computing system 105 generates a To-Be-Signed (TBS) certificate including the OID (e.g., at least one OID) of the relying party 104, the OID being an element of the certificate. The TBS certificate of the subscriber 102 is generated for the public key of the subscriber 102. The CA computing system 105 can include at least one OID of the relying party 104 into an extension of the TBS certificate of the subscriber 102. The CA computing system 105 can include at least one OID of the relying party 104 into an extension of the TBS certificate of the subscriber 102. In some examples, the OID is included within an extension, an example of which is an X.509 v3 critical extension.

At 235, the CA computing system 105 generates the certificate by signing the TBS certificate with the private signature key of the CA 103 or the CA computing system 105. The certificate generated at 235 can have various fields therein, as defined in the X.509 standard or another suitable standard. An example of the certificate is shown and described relative to FIG. 4.

In other words, at 230 and 235, the CA computing system 105 binds or wraps the OID of the replying party 102 to the certificate of the subscriber 102 by digitally signing the certificate so that the OID of the relying party 102, along with other information included in the certificate, cannot be changed unless a new certificate is used by the CA computing system 105. Accordingly, by checking the OID of the relying party 102, the relying party computing system 108 can rely on the certificate, e.g., for one or more applications on the relying party computing system 108. Trust of the certificate can therefore be improved.

In some arrangements, the CA computing system 105 can include a first OID of the plurality of OIDs of the relying party 104 into a first certificate of the subscriber 102 and a second OID of the plurality of OIDs of the relying party 104 into a second certificate of the subscriber 102, such that the first certificate can be used in connection with a first application on the relying party computing system 108 and the second certificate can be used in connection with a second application on the relying party computing system 108. The first and second certificates may correspond to the same public key. Each of the first and second certificates can include one OID. This distinguishes uses of certificates of the same public key for different applications running on the same system (e.g., the relying party computing system 108). In other words, while multiple certificates of the subscriber 102 can be issued for the same public key of the subscriber 102 and for the same relying party 104, one of the multiple certificates can be used for a given application while other certificates of the multiple certificates cannot be used for that application (and can be instead used for another application).

In some arrangements, the subscriber computing system 106 can include multiple OIDs of the relying party 104 into a same certificate of the subscriber 102, such that the same certificate can be used in connection with multiple applications on the relying party computing system 108. The certificate corresponds to one public key. This provides for one certificate for one public key to be used for different applications running on the same system (e.g., the relying party computing system 108).

At 240, the CA computing system 105 sends, via the network 110 to the subscriber computing system 106, the certificate, which the subscriber computing system 106 receives at 245.

Figure 3:
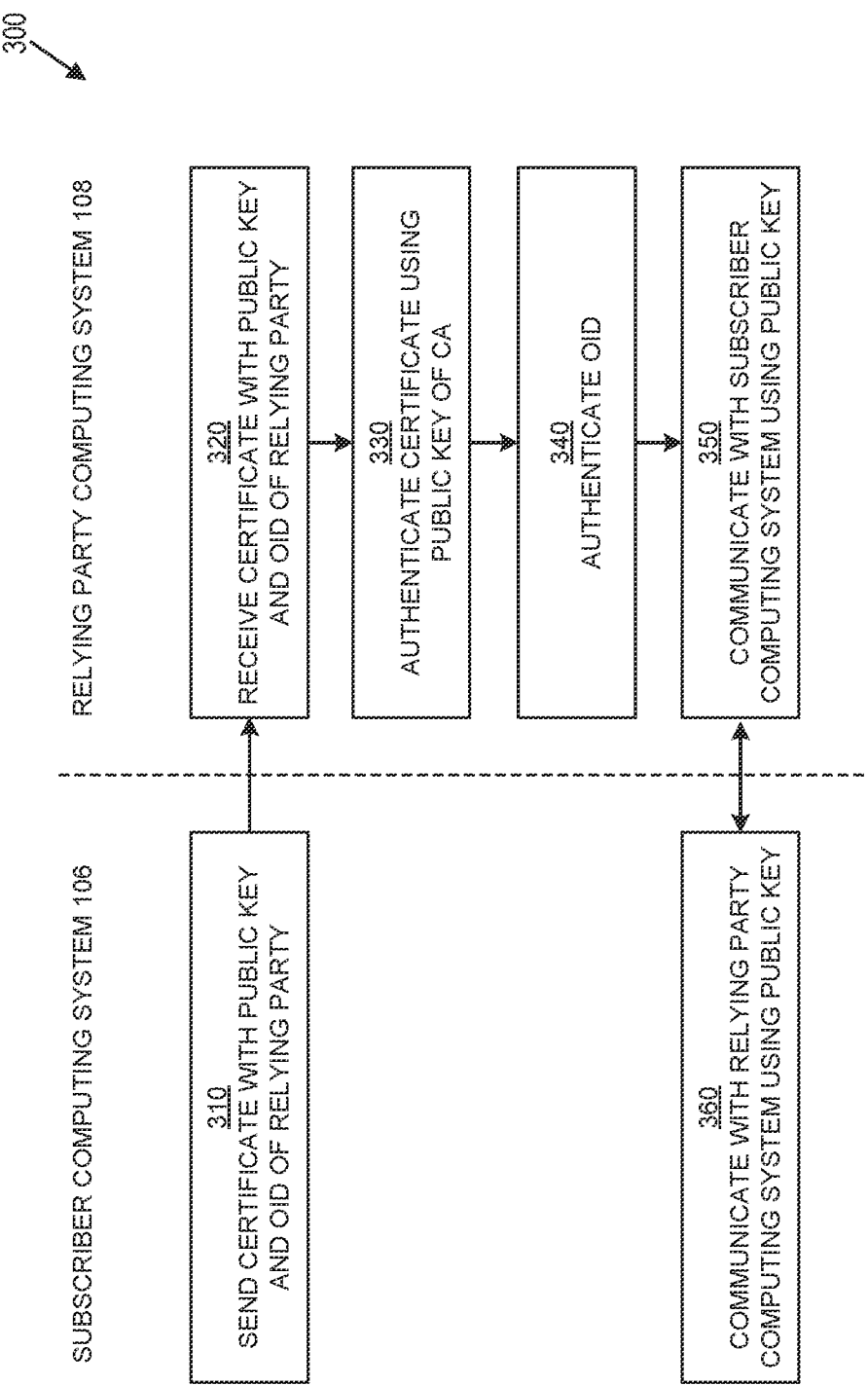
FIG. 3 is a method for using a certificate with an OID of a relying party, according to various arrangements.

FIG. 3 is a method 300 for using a certificate with an OID of the relying party 104, according to various arrangements. The method 300 can be performed by at least the subscriber computing system 106 and the relying party computing system 108. For example, the subscriber computing system 106 can perform blocks 310 and 360. The relying party computing system 108 can perform blocks 320, 330, 340, and 350. In the method 300, the relying party computing system 108 receives a certificate of the subscriber 102 from the subscriber computing system 106 (which receives the certificate from the CA computing system 105 at 245) and determines whether the certificate can be relied upon for communicating with the subscriber computing system 106.

At 310, the subscriber computing system 106 sends the certificate with the public key and the OID (e.g., at least one OID) to the relying party 104. At 320, the relying party computing system 108 receives the certificate with the public key and the OID (e.g., at least one OID) of the relying party 104. An example of the certificate is shown and described relative to FIG. 4. The subscriber computing system 106 may send a certificate in a communication request e.g., Transport Layer Security (TLS) to the relying party computing system 108.

At 330, the relying party computing system 108 authenticates the certificate of the subscriber 102 using a public key of the CA 103. For example, the relying party computing system 108 can obtain a CA certificate of the CA 103, where the CA certificate contains a public key of the CA 103. The relying party computing system 108 can verify a signature of the CA 103 in the certificate using the public key of the CA 103, in certificate chain validation. In the example in which the CA computing system 105 adds a signature of the CA 103 on the CA identifier (e.g., the issuer CA name 440 in FIG. 4) of the certificate, the relying party computing system 108 can use the public key of the CA 103 to verify the signature of the CA 103 on the CA identifier included in the certificate.

At 340, the relying party computing system 108 authenticates the OID included in the certificate to determine whether the OID included in the certificate is an OID of the relying party 104. In response to failing to authenticate the OID in the certificate, the method 300 ends. In some arrangements, the relying party computing system 108 can check the presence of the OID in an extension of the certificate. In some examples, response to determining that the OID in the certificate are the same as the OID sent by the relying party computing system 108 to the subscriber computing system 106 (e.g., at 205), the relying party computing system 108 authenticates the OID in the certificate. In some examples, response to determining that the OID in the certificate are the same as the OID sent by the relying party computing system 108 to the subscriber computing system 106 (e.g., at 205) for a given application on the relying party computing system 108, the relying party computing system 108 authenticates the OID in the certificate for that application. In the example in which the OID is not signed by the relying party computing system 108, the protection corresponds to the certificate signature, thus the CA public key is used to authenticate the certificate of the subscriber 102, e.g., at 330. In the example in which the OID is signed by the relying party computing system 108, the protection corresponds to the signature of the relying party 104 or the relying party computing system 108 and the certificate signature, thus the public key of the relying party 104 or the relying party computing system 108 (contained in another certificate) is used to authenticate the signature on the OID at 340 and CA public key is used to authenticate the certificate of the subscriber 102 at 330.

The relying party computing system 108 and the subscriber computing system 106 can use the public key (e.g., 470) in response to authenticating the OID. At 350 and 360, in response to authenticating the OID in the certificate at 340, the relying party computing system 108 and the subscriber computing system 106 communicate with each other using the public key of the subscriber 102 included in the certificate. The relying party computing system 108 can establish at least one symmetric key used for encrypting data (e.g., in a TLS) with the subscriber computing system 106 using the public key in some examples. The relying party computing system 108 can use the public key for data integrity (e.g., Hash-based Message Authentication Code (HMAC)) in some examples. For example, the relying party computing system 108 can encrypt communication, data, information, messages, and so on sent by the relying party computing system 108 to the subscriber computing system 106 using the public key of the subscriber 102 included in the certificate, for example, in TLS connections. For a large enterprise of organizations, the number of TLS client connections for the third party services via the TLS server is large. Accordingly, the RPOID scheme improves managing a large number of external TLS connections. The subscriber computing system 106 can decrypt the encrypted communication, data, information, messages encrypted using the private key of the subscriber 102 that corresponds to the public key. In addition, the relying party computing system 108 can use the public key to verify a message signature (e.g., Security Assertion Markup Language (SAML) of the subscriber 102, sign a document (e.g., for a signed mortgage), or any key management function or security protocol. The communications at 350 and 360 can be performed for at least one of 1) one or more applications on the relying party computing system 108, 2) one or more usages of the certificate, 3) one or more development stages, or 4) one or more versions of an application. In some examples, the identifier of the relying party 104 may be the same as or different from the identifier of the relying party computing system 108.

In some examples, the relying party computing system 108 and the subscriber computing system 106 can use the certificate according to various usages specified in RFC 5280 under section 4.2.1.3 of the X.509 PKI Certificate and Certificate Revocation List (CRL) Profile, including verifying digital signatures (used in entity authentication services, data origin authentication services, or integrity services), non-repudiation services, enciphering private or secret keys, enciphering raw user data without using intermediate symmetric cipher, key agreement, verifying signatures on public key certificates, verifying signatures on certificate revocation lists, Transport Layer Security (TLS), and so on, and under section 4.2.1.12 of the X.509 PKI Certificate and CRL Profile, including client authentication, code signing, email protection, time stamping, Online Certificate Status Protocol (OCSP) signing, and so on. In some examples, one or more usages of the certificate can be specified in a usage field (e.g., an extended usage field) in an extension of the certificate.

In some arrangements, authenticating the OID at 340 includes determining whether an OID included in the certificate can be used in according to the usage of the certificate as specified in the certificate. In the examples in which the OID identifies one or more applications, the relying party computing system 108 determines whether an application identified by the OID is mapped to a usage of at least one usage specified in the certificate. In response to determining that an application identified by the OID is mapped to a usage specified in the certificate, the relying party computing system 108 can use the certificate and the public key therein for the application and the usage. For example, in response to determining that the OID in the certificate identifies email (an application) and that the usage in the certificate identifies email protection, and that email the application is mapped to email protection the usage, the relying party computing system 108 can use the certificate and the public key therein for the email application and email protection. In response to determining that an application identified by the OID cannot be mapped to any usage specified in the certificate, the relying party computing system 108 fails to authenticate the OID. For example, in response to determining that the OID in the certificate identifies a TLS application and that the usage in the extended usage field of the certificate identifies code signing, and that TLS the application cannot be mapped to code signing the usage, the relying party computing system 108 fails to authenticate the OID.

In some examples, the OID in the certificate can explicitly identify a usage, such that the relying party computing system 108 can attempt to match the usage identified by the OID with the usage included in the usage field in an extension of the certificate.

In some examples, the OID in the certificate can identify a usage including one or more stages of developing a software (e.g., an application) or a platform including multiple applications. The stages of development includes testing, User Accepted Testing (UAT), pilot, production, and so on. In a testing stage (e.g., a lower environment), the data communicated between the relying party computing system 108 and the subscriber computing system 106 may be test data stored in a database. In the testing stage, the public keys and the corresponding private keys used may be less cryptographically secure as the risk of attack is lower. In a production stage, the data communicated between the relying party computing system 108 and the subscriber computing system 106 may be real sensitive data stored in a database or collected by one or more of the relying party computing system 108 and the subscriber computing system 106. Thus, in the production stage, the public keys and the corresponding private keys used may be more cryptographically secure as the risk of attack is higher. This usage of OID as applied to different development stages allow granular control of certificates and keys, and improve security in developing a software or a platform over traditional systems in which the stage of development is included in the subject of the certificate.

The relying party computing system 108 can use the certificate (e.g., the public key of the subscriber 102) in the stage of development as indicated in the OID. For example, in response to determining that the OID in the certificate identifies a testing stage, the relying party computing system 108 can use the certificate for usages or applications in the testing stage, and not for other stages such as production. Subsequently, the subscriber computing system 106 can send a new certificate including an OID identifying a production stage, the relying party computing system 108 can use the new certificate for usages or applications in the production stage, and not for other stages such as the testing stage. The new certificate may include the same public key as the previous certificate in some examples. In other examples, the new certificate may include a public key different from that in the previous certificate.

In some examples, the OID in the certificate can identify a version of an application or software. The OID as applied to different versions allow granular control of certificates and keys, and improve security in different versions of the software. The relying party computing system 108 can use the certificate (e.g., the public key of the subscriber 102) for the version of an application as indicated in the OID. For example, in response to determining that the OID in the certificate identifies version 2.0 of an application, the relying party computing system 108 can use the certificate for that version 2.0 of the application, and not for other versions such as version 1.0 of the same application. Subsequently, the subscriber computing system 106 can send a new certificate including an OID identifying version 3.0 of the application, the relying party computing system 108 can use the new certificate for version 3.0 of the application, and not for other versions. The new certificate may include the same public key as the previous certificate in some examples. In other examples, the new certificate may include a public key different from that in the previous certificate.

Figure 4:
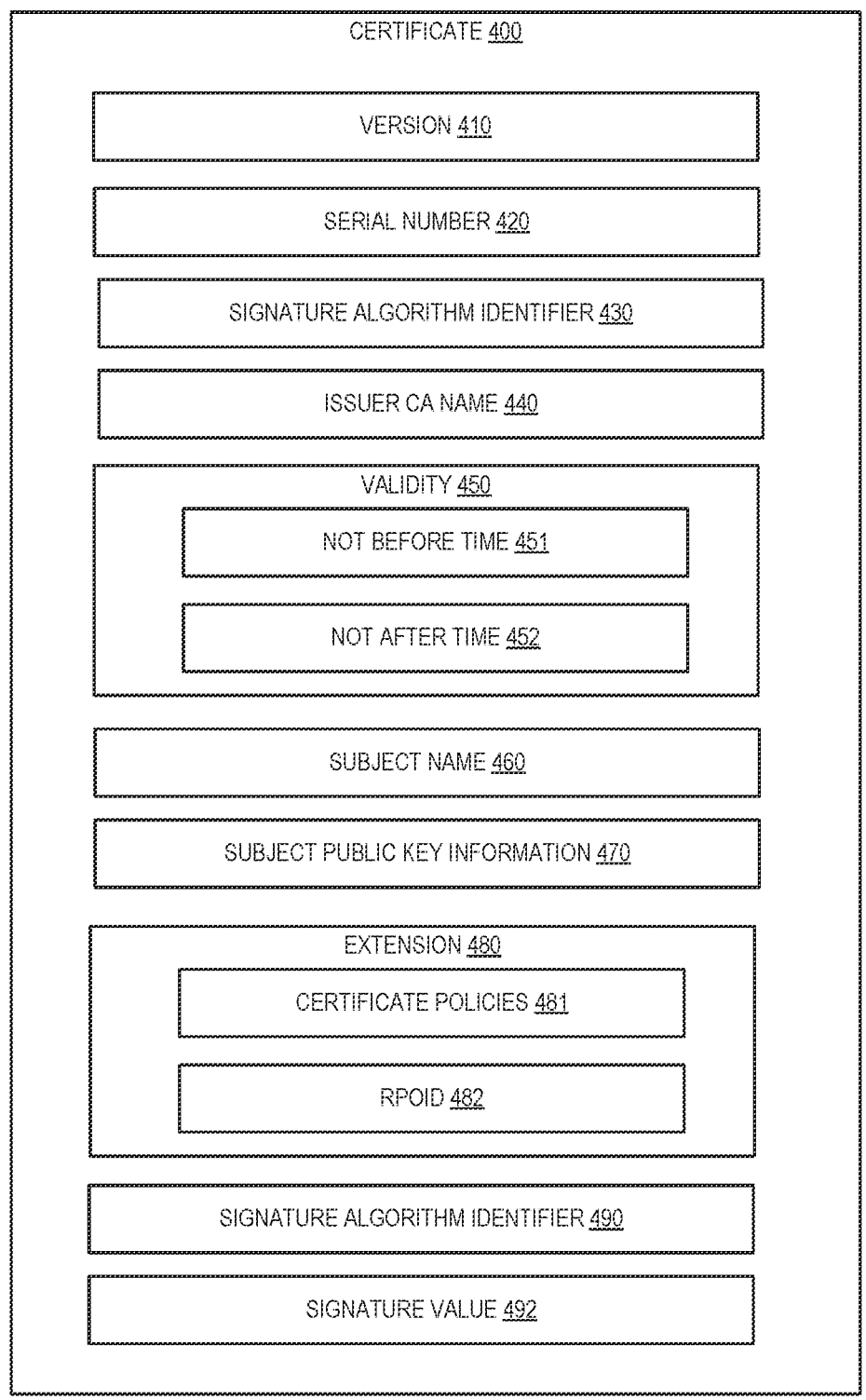
FIG. 4 is a diagram illustrating an example certificate of the subscriber, according to various arrangements.

FIG. 4 is a diagram illustrating an example certificate 400 of the subscriber 102 according to various arrangements. The certificate 400 can include an OID of the relying party 104 (e.g., RPOIDS) in an extension 480 of the certificate 400. The certificate 400 has various fields with information, as shown. A certificate may have other fields not shown in FIG. 4. The certificate 400 can be issued by the CA computing system 105. The certificate 400 can include a version 410 and serial number 420 that respectively identify the version and the serial number associated with the certificate for identification purposes.

The subject name 460 can be a name of the subscriber 102 (e.g., an individual, a company, organization, an email address, or so on) or a name of the subscriber computing system 106 (e.g., a device) associated with the subscriber 102. The subject name 460 can be any distinguished name of any suitable entity that the certificate is used to secure. The subject public key information 470 defines a public key that can be used by the relying party computing system 108 to encrypt communication, data, information, messages, and so on sent by the relying party computing system 108 to the subscriber computing system 106. The relying party computing system 108 can establish at least one symmetric key used for encrypting data with the subscriber computing system 106 using the public key in some examples. The relying party computing system 108 can use the public key for data integrity (e.g., HMAC) in some examples. The subscriber computing system 106 can decrypt, using a corresponding private key of the subscriber 102 or of the subscriber computing system 106, the encrypted communication, data, information, messages. The CA computing system 105 receives the subject name 460 and the subject public key information 470 in the request from the subscriber computing system 106 (at 220).

The issuer CA name 440 identifies the CA 103 or the CA computing system 105 which issues the certificate 400. The issuer CA name 440 can be signed by the CA computing system 105 using a signature of the CA 103 or the CA computing system 105. The relying party computing system 108 can verify the signature using a public key of the CA 103 or the CA computing system 105 that is identified by the issuer CA name 440, for example, in certificate chain validation. Upon verification of the signature of the CA 103 or the CA computing system 105, the relying party computing system 108 can rely on the certificate 400 and the content therein. The signature algorithm identifier 430 identifies the signature algorithm used to sign the issuer CA name 440.

The validity information 450 indicates the time by which the certificate 400 is valid according to the CA 103. For example, the validity information 450 can include a not before time 451 (the time before which the certificate 400 is invalid) and/or a not after time 452 (the time after which the certificate 400 is invalid). The not after time 453 can correspond to a Time-To-Live (TTL) of the certificate 400. The extension 480, which can include one or more X.509 v3 extensions, includes at least one certificate policy 481 for using the certificate 400 (which can be a link such as an Uniform Resource Locator (URL) or an object identifier), and so on. In some arrangements, the RPOID 482 has a first TTL, the certificate 400 has a second TTL, and the first TTL is longer than the second TTL. In such arrangements, the RPOID 482 with the first TTL can be included in one or more additional certificates, each of which is similar to the certificate 400 and has a TTL. For instance, a second certificate of the one or more additional certificates can be generated after the certificate 400 with the second TTL is generated, to cover a portion of a remainder of the first TTL after the second TTL expires. A third certificate of the one or more additional certificates can be generated after the second certificate is generated, to cover a portion of a remainder of the first TTL after the TTL of the second certificate expires.

The extension 480 includes the at least one OID (e.g., at least one RPOID 482) of the relying party 104. For example, the at least one POID 482 can be one OID identifying one or more of the relying party 104, the relying party computing system 108, or an application on the relying party computing system 108. In some examples, the at least one RPOID 482 can be multiple RPOIDs each identifying a separate application on the relying party computing system 108.

In some examples, the extension 480 can further include at least one usage of the certificate 400, which can include one or more of verifying digital signatures (used in entity authentication services, data origin authentication services, or integrity services), non-repudiation services, enciphering private or secret keys, enciphering raw user data without using intermediate symmetric cipher, key agreement, verifying signatures on public key certificates, verifying signatures on certificate revocation lists, TLS, client authentication, code signing, email protection, time stamping, OCSP signing, and so on.

The certificate 400 can include a signature algorithm identifier 490 and a signature value 492. The elements 410, 420, 430, 440, 450, 460, 470, and 480 are included in the TBS certificate generated at 230. The signature value 492 and the signature algorithm identifier 490 that identifies the signature algorithm of the signature defined by the signature value 492 are generated at 235. For example, the CA computing system 105 generates the certificate 400 by signing the TBS certificate with the private signature key of the CA 103 or the CA computing system 105 (to generate the signature value 492) using the signature algorithm identified by the signature algorithm identifier 490 (e.g., RSA-SHA256). The TBS certificate includes the CA signature algorithm identifier 430 such that the integrity of the TBS certificate can be included within the certificate signature, and the signature itself is a compound object that includes the same CA signature algorithm identifier and the signature. Accordingly, the signature algorithm identifiers 430 and 490 can have the same value, although only signature algorithm identifier 430 is included in the signed data (e.g., the TBS certificate).

Figure 5A:
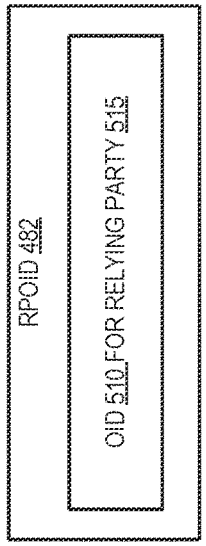
FIGS. 5A, 5B, 5C, 5D, and 5E illustrate examples of at least one OID, in some arrangements.

FIG. 5A illustrates an example of the at least one RPOID 482, in some arrangements. The at least one RPOID 482 may include one OID 510 for one relying party 515, an example of which is the relying party 104. The public key (defined by the subject public key information 470) included in the certificate 400 can be used for only the relying party 515, for example, for one or more applications on the relying party computing system of the relying party 515.

Figure 5B:
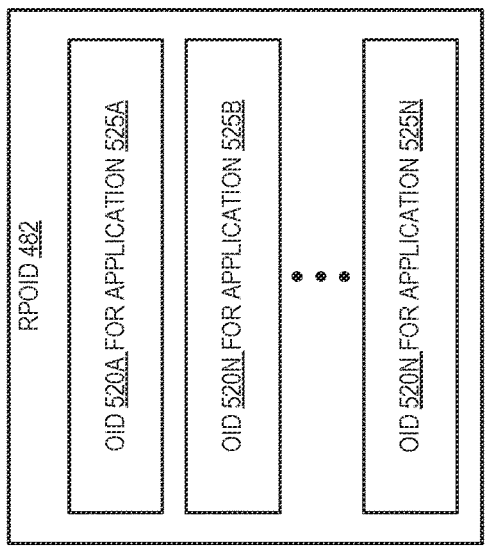

FIG. 5B illustrates an example of the at least one RPOID 482, in some arrangements. The at least one RPOID 482 may include multiple OIDs 520A, 520B, . . . , 520N, each of which corresponds to or identifies a different one of multiple applications 525A, 525B, . . . , 525N. In some arrangements, the applications 525A, 525B, . . . , 525N run on the same relying party computing system. Thus, the applications 525A, 525B, . . . , 525N are for the same relying party computing system. The public key (defined by the subject public key information 470) included in the certificate 400 can be used for multiple applications on the same relying party. In some arrangements, the applications 525A, 525B, . . . , 525N run on two or more different relying party computing systems. Thus, the applications 525A, 525B, . . . , 525N are for two or more different relying parties. The public key (defined by the subject public key information 470) included in the certificate 400 can be used for multiple applications on different relying party computing systems. This scheme allows the CA 103 to generate one certificate for one public key that can be used for multiple applications on the same relying party computing system or different relying party computing systems.

Figure 5C:
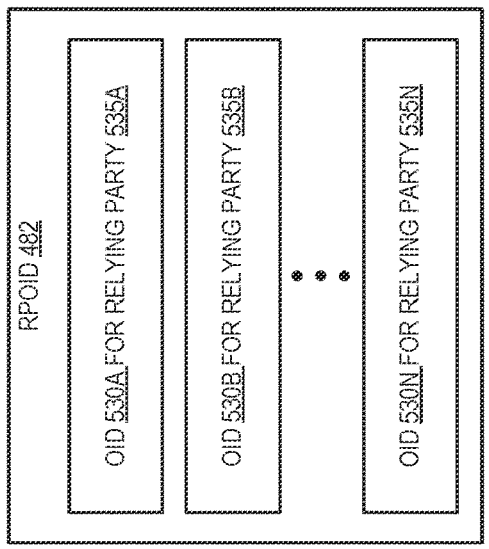

FIG. 5C illustrates an example of the at least one RPOID 482, in some arrangements. The at least one RPOID 482 may include multiple OIDs 530A, 530B, . . . , 530N, each of which corresponds to or identifies a different one of multiple relying parties 535A, 535B, . . . , 535N, an example of each of which is the relying party 104. The public key (defined by the subject public key information 470) included in the certificate 400 can be used for the relying parties 535A, 535B, . . . , 535N, for example, for one or more applications on each of the relying party computing systems of the relying parties 535A, 535B, . . . , 535N. The subscriber computing system 106 can send the OIDs 530A, 530B, . . . , 530N of the multiple relying parties 535A, 535B, . . . , 535N in the request for certificate at 220. This scheme allows the CA 103 to generate one certificate for one public key that can be used for multiple different relying party computing systems. This scheme also notifies one relying party of other relying parties (e.g., the OIDs of other relying parties) that are sharing the certificate, that are sharing the public key, or that are in the business relationship. Including the OIDs of multiple relying parties conserves CA resources and simplifies the certificate mechanism, given that conventionally, a certificate of one public key can only be generated for one relying party.

Figure 5D:
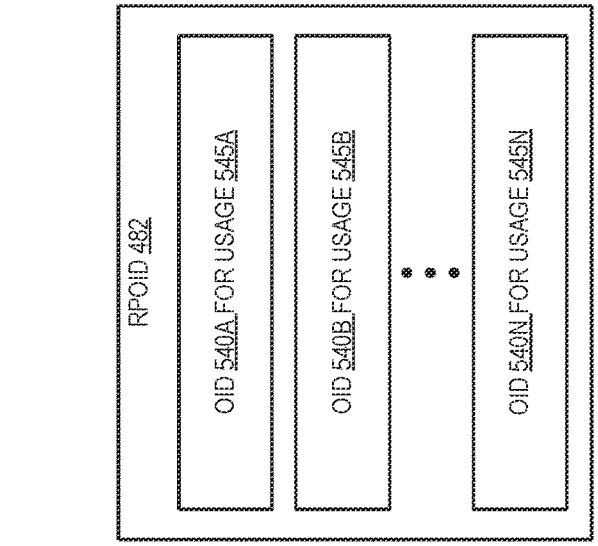

FIG. 5D illustrates an example of the at least one RPOID 482, in some arrangements. The at least one RPOID 482 may include multiple OIDs 540A, 540B, . . . , 540N, each of which corresponds to or identifies a different one of multiple usages 545A, 545B, . . . , 545N. The public key (defined by the subject public key information 470) included in the certificate 400 can be used for the usages 545A, 545B, . . . , 545N, for example, for one or more applications on a relying party computing system. The subscriber computing system 106 can send the OIDs 540A, 540B, . . . , 540N of the multiple usages 545A, 545B, . . . , 545N in the request for certificate at 220.

Figure 5E:
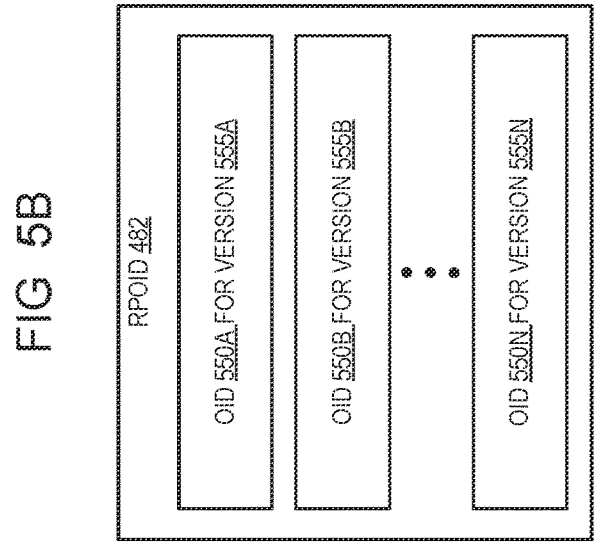

FIG. 5E illustrates an example of the at least one RPOID 482, in some arrangements. The at least one RPOID 482 may include multiple OIDs 550A, 550B, . . . , 550N, each of which corresponds to or identifies a different one of multiple versions 555A, 555B, . . . , 555N of one or more applications on one or more relying party computing systems. The public key (defined by the subject public key information 470) included in the certificate 400 can be used for the versions 555A, 555B, . . . , 555N, which can be for the same or different applications or same or different relying party computing systems. The subscriber computing system 106 can send the OIDs 550A, 550B, . . . , 550N of the multiple versions 555A, 555B, . . . , 555N in the request for certificate at 220.

In some examples, one OID can be used to identify two or more of 1) at least one relying party; 2) at least one relying party computing device; 3) at least one application; 4) at least one usage; or 5) at least one version of at least one application. For example, one portion of the OID can be used to indicate one of 1) at least one relying party; 2) at least one relying party computing device; 3) at least one application; 4) at least one usage; or 5) at least one version of at least one application while another portion of the OID can be used to indicate a different one of 1) at least one relying party; 2) at least one relying party computing device; 3) at least one application; 4) at least one usage; or 5) at least one version of at least one application. In some examples, the OID may have a value that can be mapped to a particular combination of two or more of 1) at least one relying party; 2) at least one relying party computing device; 3) at least one application; 4) at least one usage; or 5) at least one version of at least one application.

Figure 6:
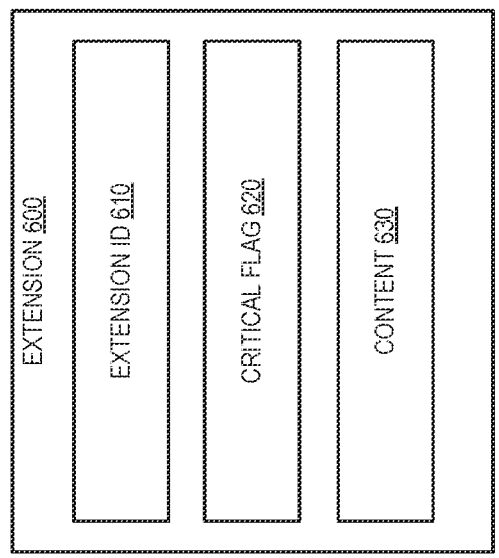
FIG. 6 is a diagram illustrating an example extension of a certificate, according to some arrangements.

FIG. 6 is a diagram illustrating an example extension 600 of a certificate, according to some arrangements. The certificate that contains the extension 600 can be any certificate disclosed herein. The extension 600 can be a X.509 v3 critical extension in some examples. The extension 600 includes an extension ID 610, a critical flag 620, and content 630. The content 630 includes for example the OID of the relying party 104 or the RPOID 482. The extension ID 610 is an OID that defines or otherwise identifies the content (e.g., the content 630) that the extension 600 contains or encapsulates. In some examples, the extension ID 610 is an OID that identifies that the extension 600 contains RPOID. The critical flag 620 (e.g., Yes or No) defines whether the extension 600 is critical. In the example in which the critical flag 620 is set to Yes (the extension 600 is critical), in response to the relying party computing system 108 failing to recognize the extension ID 610 (e.g., failing to appreciate what the extension ID 610 identifies), the certificate 400 is rejected. The relying party computing system 108 may fail to recognize the extension ID 610 due to outdated or decommissioned application identifier, outdated or decommissioned extension ID, misconfiguration of the application, outdated version of the application, and so on. Therefore, the critical flag 620 being set to Yes imposes use of the RPOID. In the example in which the critical flag 620 is set to No (the extension 600 is not critical), in response to the relying party computing system 108 failing to recognize the extension ID 610 (e.g., failing to appreciate what the extension ID 610 identifies), the extension 600 is ignored but the certificate including the extension 600 is accepted and used. The non-critical flag renders the use of RPOID optional, for example, in the scenarios in which a system or network is being converting to implement or remove RPOID, within a sunrise and/or sunset date associated with the RPOID. In this case, the extension 600 or another RPOID extension can include a time that RPOID is set to be online or offline.

As utilized herein, the terms "approximately," "substantially," and similar terms are intended to have a broad meaning in harmony with the common and accepted usage by those of ordinary skill in the art to which the subject matter of this disclosure pertains. It should be understood by those of ordinary skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the disclosure as recited in the appended claims.

Although only a few arrangements have been described in detail in this disclosure, those skilled in the art who review this disclosure will readily appreciate that many modifications are possible (e.g., variations in sizes, dimensions, structures, shapes, and proportions of the various elements, values of parameters, mounting arrangements, use of materials, colors, orientations, etc.) without materially departing from the novel teachings and advantages of the subject matter described herein. For example, elements shown as integrally formed may be constructed of multiple components or elements, the position of elements may be reversed or otherwise varied, and the nature or number of discrete elements or positions may be altered or varied. The order or sequence of any method processes may be varied or re-sequenced according to alternative arrangements. Other substitutions, modifications, changes, and omissions may also be made in the design, operating conditions and arrangement of the various exemplary arrangements without departing from the scope of the present disclosure.

The arrangements described herein have been described with reference to drawings. The drawings illustrate certain details of specific arrangements that implement the systems, methods and programs described herein. However, describing the arrangements with drawings should not be construed as imposing on the disclosure any limitations that may be present in the drawings.

It should be understood that no claim element herein is to be construed under the provisions of 35 U.S.C. § 112(f), unless the element is expressly recited using the phrase "means for."

As used herein, the term "circuit" may include hardware structured to execute the functions described herein. In some arrangements, each respective "circuit" may include machine-readable media for configuring the hardware to execute the functions described herein. The circuit may be embodied as one or more circuitry components including, but not limited to, processing circuitry, network interfaces, peripheral devices, input devices, output devices, sensors, etc. In some arrangements, a circuit may take the form of one or more analog circuits, electronic circuits (e.g., integrated circuits (IC), discrete circuits, system on a chip (SOCs) circuits, etc.), telecommunication circuits, hybrid circuits, and any other type of "circuit." In this regard, the "circuit" may include any type of component for accomplishing or facilitating achievement of the operations described herein. For example, a circuit as described herein may include one or more transistors, logic gates (e.g., NAND, AND, NOR, OR, XOR, NOT, XNOR, etc.), resistors, multiplexers, registers, capacitors, inductors, diodes, wiring, and so on).

The "circuit" may also include one or more processors communicatively coupled to one or more memory or memory devices. In this regard, the one or more processors may execute instructions stored in the memory or may execute instructions otherwise accessible to the one or more processors. In some arrangements, the one or more processors may be embodied in various ways. The one or more processors may be constructed in a manner sufficient to perform at least the operations described herein. In some arrangements, the one or more processors may be shared by multiple circuits (e.g., circuit A and circuit B may include or otherwise share the same processor which, in some example arrangements, may execute instructions stored, or otherwise accessed, via different areas of memory). Alternatively or additionally, the one or more processors may be structured to perform or otherwise execute certain operations independent of one or more co-processors. In other example arrangements, two or more processors may be coupled via a bus to enable independent, parallel, pipelined, or multi-threaded instruction execution. Each processor may be implemented as one or more general-purpose processors, application specific integrated circuits (ASICs), field programmable gate arrays (FPGAs), digital signal processors (DSPs), or other suitable electronic data processing components structured to execute instructions provided by memory. The one or more processors may take the form of a single core processor, multi-core processor (e.g., a dual core processor, triple core processor, quad core processor, etc.), microprocessor, etc. In some arrangements, the one or more processors may be external to the apparatus, for example the one or more processors may be a remote processor (e.g., a cloud based processor). Alternatively or additionally, the one or more processors may be internal and/or local to the apparatus. In this regard, a given circuit or components thereof may be disposed locally (e.g., as part of a local server, a local computing system, etc.) or remotely (e.g., as part of a remote server such as a cloud based server). To that end, a "circuit" as described herein may include components that are distributed across one or more locations.

An exemplary system for implementing the overall system or portions of the arrangements might include a general purpose computing computers in the form of computers, including a processing unit, a system memory, and a system bus that couples various system components including the system memory to the processing unit. Each memory device may include non-transient volatile storage media, non-volatile storage media, non-transitory storage media (e.g., one or more volatile and/or non-volatile memories), a distributed ledger (e.g., a blockchain), etc. In some arrangements, the non-volatile media may take the form of ROM, flash memory (e.g., flash memory such as NAND, 3D NAND, NOR, 3D NOR, etc.), EEPROM, MRAM, magnetic storage, hard discs, optical discs, etc. In other arrangements, the volatile storage media may take the form of RAM, TRAM, ZRAM, etc. Combinations of the above are also included within the scope of machine-readable media. In this regard, machine-executable instructions include, for example, instructions and data which cause a general purpose computer, special purpose computer, or special purpose processing machines to perform a certain function or group of functions. Each respective memory device may be operable to maintain or otherwise store information relating to the operations performed by one or more associated circuits, including processor instructions and related data (e.g., database components, object code components, script components, etc.), in accordance with the example arrangements described herein.

It should be noted that although the diagrams herein may show a specific order and composition of method steps, it is understood that the order of these steps may differ from what is depicted. For example, two or more steps may be performed concurrently or with partial concurrence. Also, some method steps that are performed as discrete steps may be combined, steps being performed as a combined step may be separated into discrete steps, the sequence of certain processes may be reversed or otherwise varied, and the nature or number of discrete processes may be altered or varied. The order or sequence of any element or apparatus may be varied or substituted according to alternative arrangements. Accordingly, all such modifications are intended to be included within the scope of the present disclosure as defined in the appended claims. Such variations will depend on the machine-readable media and hardware systems chosen and on designer choice. It is understood that all such variations are within the scope of the disclosure. Likewise, software and web arrangements of the present disclosure could be accomplished with standard programming techniques with rule based logic and other logic to accomplish the various database searching steps, correlation steps, comparison steps and decision steps.

The foregoing description of arrangements has been presented for purposes of illustration and description. It is not intended to be exhaustive or to limit the disclosure to the precise form disclosed, and modifications and variations are possible in light of the above teachings or may be acquired from this disclosure. The arrangements were chosen and described in order to explain the principals of the disclosure and its practical application to enable one skilled in the art to utilize the various arrangements and with various modifications as are suited to the particular use contemplated. Other substitutions, modifications, changes and omissions may be made in the design, operating conditions and arrangement of the arrangements without departing from the scope of the present disclosure as expressed in the appended claims.

What is claimed is:

1. A method, comprising:

sending, by a relying party computing system to a subscriber computing system, an Object Identifier (OID) of a relying party associated with the relying party computing system;

receiving, by the relying party computing system from the subscriber computing system, a certificate of a subscriber associated with the subscriber computing system, the certificate comprises a public key of the subscriber;

determining, by the relying party computing system, whether the certificate comprises the OID of the relying party; and in response to determining that the certificate comprises the OID of the relying party, using by the relying party computing system the public key in the certificate of the subscriber, wherein the certificate comprises an extension having:

the OID of the relying party;

an extension identifier identifying that the certificate contains the OID of the relying party; and a critical flag, wherein the critical flag being set to critical indicates rejection of the certificate in response to determining that the extension identifier is not recognized, and the critical flag being set to non-critical indicates ignoring the extension in response to determining that the extension identifier is not recognized.

2. The method of claim 1, wherein
determining whether the certificate comprises the OID of the relying party comprises determining whether the extension containing the certificate comprises the OID of the relying party.

3. The method of claim 1, wherein
the OID of the relying party corresponds to an application of the relying party computing system;
determining whether the certificate comprises the OID of the relying party comprises determining whether the certificate comprises the OID corresponding to the application; and
using the public key comprises:
communicating by the relying party computing system with the subscriber computing system for the application using the public key in the certificate of the subscriber;
verifying by the relying party computing system a signature of message; or
signing by the relying party computing system a document.

4. The method of claim 1, wherein the OID of the relying party comprises a plurality of OIDs, each of the plurality of OIDs identifies a corresponding one of a plurality of applications of the relying party computing system.

5. The method of claim 4, wherein
determining whether the certificate comprises the OID of the relying party comprises determining whether the certificate comprises an OID of the plurality of the OIDs corresponding to an application of the plurality of applications; and
using the public key comprises:
communicating by the relying party computing system with the subscriber computing system for the application of the plurality of applications using the public key in the certificate of the subscriber;
verifying by the relying party computing system a signature of message; or
signing by the relying party computing system a document.

6. The method of claim 1, further comprising:
adding, by the relying party computing system, a signature on the OID of the relying party by signing the OID of the relying party with a private key of the relying party; and
the signed OID of the relying party with the signature is sent to the subscriber computing system.

7. The method of claim 6, further comprising authenticating, by the relying party computing, the OID received in the certificate of the subscriber by verifying the signature on the OID of the relying party contained in the certificate of the subscriber.

8. The method of claim 1, wherein using the public key in the certificate of the subscriber comprises:
establishing, by the relying party computing system, at least one symmetric key for encrypting data or data integrity using the public key of the subscriber.

9. The method of claim 1, wherein the OID of the relying party identifies a stage of development, and the relying party computing system communicates with the subscriber computing system using the public key in the certificate of the subscriber for the stage of development.

10. The method of claim 1, wherein the OID of the relying party identifies a version of an application on the relying party computing system, and the relying party computing system communicates with the subscriber computing system using the public key in the certificate of the subscriber for the version of the application.

11. A method, comprising:
receiving, by a subscriber computing system from a relying party computing system, an Object Identifier (OID) of a relying party associated with the relying party computing system;
generating a public key of a subscriber associated with the subscriber computing system and a private key of the subscriber, the private key corresponding to the public key;
sending, by the subscriber computing system to a Certificate Authority (CA) computing system, a request for a certificate, wherein the request comprises the public key of the subscriber and the OID of the relying party;
receiving, by the subscriber computing system from the CA computing system, the certificate of the subscriber in response to the request, wherein the certificate comprises the public key of the subscriber and the OID of the relying party; and
sending, by the subscriber computing system to the relying party computing system, the certificate of the subscriber, wherein
the relying party computing system use the public key in the certificate of the subscriber in response to the relying party computing system authenticating the OID of the relying party, wherein the certificate comprises an extension having:
the OID of the relying party;
an extension identifier identifying that the certificate contains the OID of the relying party; and
a critical flag, wherein the critical flag being set to critical indicates rejection of the certificate in response to determining that the extension identifier is not recognized, and the critical flag being set to non-critical indicates ignoring the extension in response to determining that the extension identifier is not recognized.

12. The method of claim 11, wherein the OID of the relying party comprises a plurality of OIDs, each of the plurality of OIDs identifies a corresponding one of a plurality of applications of the relying party computing system.

13. A method, comprising:
receiving, by a Certificate Authority (CA) authority, a request for a digital certificate, wherein the request comprises an Object Identifier (OID) of a relying party associated with a relying party computing system;
generating, by the CA authority, a certificate comprising the OID of the relying party; and
sending, by the CA authority, the certificate to a subscriber computing system, wherein the relying party computing system use the public key in the certificate in response to authenticating the OID of the relying party, wherein the certificate comprises an extension having:
the OID of the relying party;
an extension identifier identifying that the certificate contains the OID of the relying party; and
a critical flag, wherein the critical flag being set to critical indicates rejection of the certificate in response to determining that the extension identifier is not recognized, and the critical flag being set to non-critical indicates ignoring the extension in response to determining that the extension identifier is not recognized.

14. The method of claim 13, comprising:
generating a To Be Signed (TBS) certificate comprising the OID of the relying party; and generating the certificate by signing the TBS certificate with a private key of the CA authority.

15. The method of claim 13, wherein at least one of:

the OID of the relying party corresponds to an application of the relying party computing system;

the OID of the relying party corresponds to a stage of development of the application on the relying party computing system;

the OID of the relying party corresponds to a version of the application on the relying party computing system.

* * * * *